United States Patent [15] 3,697,701
Greason, III et al. [45] Oct. 10, 1972

[54] IMPROVED SCANNABLE LINE CIRCUIT FOR COMMON CONTROL TELEPHONE SYSTEM

[72] Inventors: William Wallace Greason, III, Longmont; David William Weiner, Boulder, both of Colo.

[73] Assignee: Bell Telephone Laboratories, Incorporated, Murray Hill, N.J.

[22] Filed: Dec. 21, 1970

[21] Appl. No.: 100,314

[52] U.S. Cl. ..........................179/18 FA, 179/18 AD
[51] Int. Cl. ..............................................H04q 3/22
[58] Field of Search.......179/18 AD, 18 FA, 18 FG, 18 FH, 179/27 CA

[56] References Cited

UNITED STATES PATENTS 3,377,432 4/1968 Abbott et al...........179/18 FH

FOREIGN PATENTS OR APPLICATIONS 677,158 7/1966 Belgium.................179/18 FH

*Primary Examiner*—Thomas W. Brown
*Attorney*—R. J. Guenther and James Warren Falk

[57] ABSTRACT

A telephone system suitable for use as a private branch exchange with 40 lines or less comprises a switching network that establishes call connections for station line circuits, registers and trunks under common control. Each line circuit comprises amplifier and gate control facilities which cooperate in the control of the switching network. The gate facilities include an address gate and a zener diode controlled gate which initially are scanned for detecting a service request and are rescanned on a callback operation to identify the calling line following a dialing operation.

7 Claims, 4 Drawing Figures

INVENTORS W. W. GREASON, III
D. W. WEINER

BY Frederick W. Padden

ATTORNEY

IMPROVED SCANNABLE LINE CIRCUIT FOR COMMON CONTROL TELEPHONE SYSTEM

BACKGROUND OF THE INVENTION

This invention relates to communication systems and particularly to circuitry for station lines in telephone systems.

Present day communication switching systems often utilize a call processing technique known as callback. This technique is used to obtain the identity of a calling circuit incident to the completion of call connections. It usually involves the electrical marking of a station line circuit for callback and then line scanning to identify the marked circuit. A proven advantage of callback facilities is that they eliminate the need for costly and complex equipment which continuously stores the identity of the calling circuit during the establishment of call connections.

Prior art line circuits providing callback service have customarily operated in a system equipped with a plurality of voltages including a special callback marking potential and bias voltages furnished by different power supplies. The cost of such power supplies has been known to constitute a substantial percentage of the entire system cost. In view thereof and in an endeavor to make certain new systems more economically practicable, recent design criteria have required that each such system operate with a single voltage power supply. This has resulted in a problem of providing and reliably operating station line circuits with the single voltage power supply and with minimal undesired interaction between callback and other service tasks.

SUMMARY OF THE INVENTION

In accordance with principles of our invention, a solution to the foregoing problem is achieved by providing an illustrative line circuit which comprises electronic gate and amplifiers that operate on a single voltage power supply and reliably distinguish among service request, callback and other call service tasks of the line circuit. Specifically, the illustrative line circuit comprises a zener diode controlled line circuit enable gate and a line address gate which operate with simple bias voltage arrangements of an illustrative single voltage power supply of −24 volts. The line circuit enable gate cooperates with a common control circuit to partially enable the line address gate in response to either a service request on the telephone station line or a callback signal on a supervisory sleeve lead extending through a switching network. The address gate is thereafter fully enabled in response to coincidentally received line scanning signals from the common control circuit. The zener diode arrangement advantageously enables the line circuit enable gate in response to a callback signal on the sleeve lead but blocks the enabling of that gate in response to call holding and disconnect supervisory signals transmittable over the same sleeve lead.

The zener diode controlled gate and the line address gate are initially operated by a common control circuit to detect a service request during a scanning operation. Following a detection of a service request, the common control selects and connects an idle register through the switching network to the service requesting line. The register next applies a holding signal to the sleeve lead extending to the line circuit for holding the established connections. Dial tone is then transmitted by the register to the calling station over the established connections. The common control then releases from the call. Thereafter, the calling party dials the desired number and it is stored in the register. Following the completion of dialing, the register reengages the common control circuit for decoding the stored number and then completing call connections to the called party.

Before the latter connections are completed, however, the common control must obtain the address of the calling line circuit since the number is not stored in the system. The identity is obtained by a callback operation in which the common control instructs the register to apply a callback marking potential to the sleeve lead path through the network to the calling line circuit. The marking potential advantageously switches the zener diode into its zener current conducting region for enabling the line circuit enable gate so that coincidentally received line scanning signals from the common control enable the address gate to inform the common control of the marked line circuit address. The marking potential on the sleeve lead also holds the call connections through the switching network until the common control instructs the register to apply a disconnect signal to the sleeve lead. Thereafter, the common control utilizes the decoded called number and the line circuit address to complete caller to called party connections through the switching network.

Other features of our illustrative line circuit include the provision of switching network control circuitry including a hold gate and amplifiers cooperating with the common control circuit and the sleeve conductor for establishing, holding and disconnecting connections through "A" and "B" links of the switching network. Our illustrative line circuit further includes steering gate and amplifier circuitry which is responsive to steering signals from the common control circuit for operating a steering relay in the network which connects the station line of the line circuit to either the "A" or "B" links.

DESCRIPTION OF THE DRAWING

The foregoing and other objects and features of this invention will become apparent from a reading of the following description of an illustrative embodiment of our invention taken in conjunction with the drawing in which.

Figure 3:
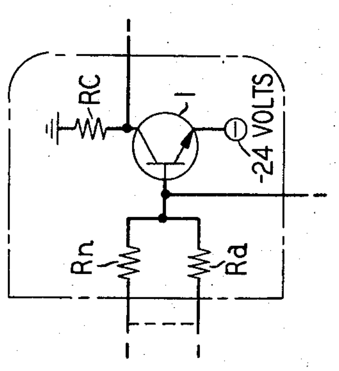
FIG. 3 illustrates the basic transistor-resistor logic circuit that is utilized in the line circuit of FIG. 2 as a gate.
Figure 4:
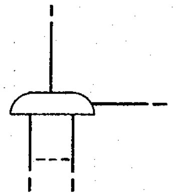
FIG. 4 illustrates the symbolization used for the circuit of FIG. 3.

The transistor-resistor logic circuit depicted in FIG. 3 comprises a single NPN transistor 1, a collector resistor RC and a plurality of input resistors *Ra–Rn* of which there is one for each input to the stage. The circuit of FIG. 3 is basically a single stage inverter since a positive signal hereinafter referred to as a "HIGH" applied to the base appears as a negative signal hereinafter referred to as a "LOW" at the collector and vice versa.

The stage may be used as an inverting OR gate by leaving the circuit normally "OFF," that is, with all inputs LOW ($-v$). In this case, a HIGH signal applied to one or more of the input leads will turn the transistor "ON" and provide a LOW signal on the collector. The stage may also be used as an inverting AND gate in which case the transistor is normally held "ON" by a positive HIGH signal applied to one of more of its input leads. The AND condition of the circuit is achieved by a negative LOW potential on all input leads at which time the transistor turns "OFF" and produces a HIGH signal at its output.

Figure 1:
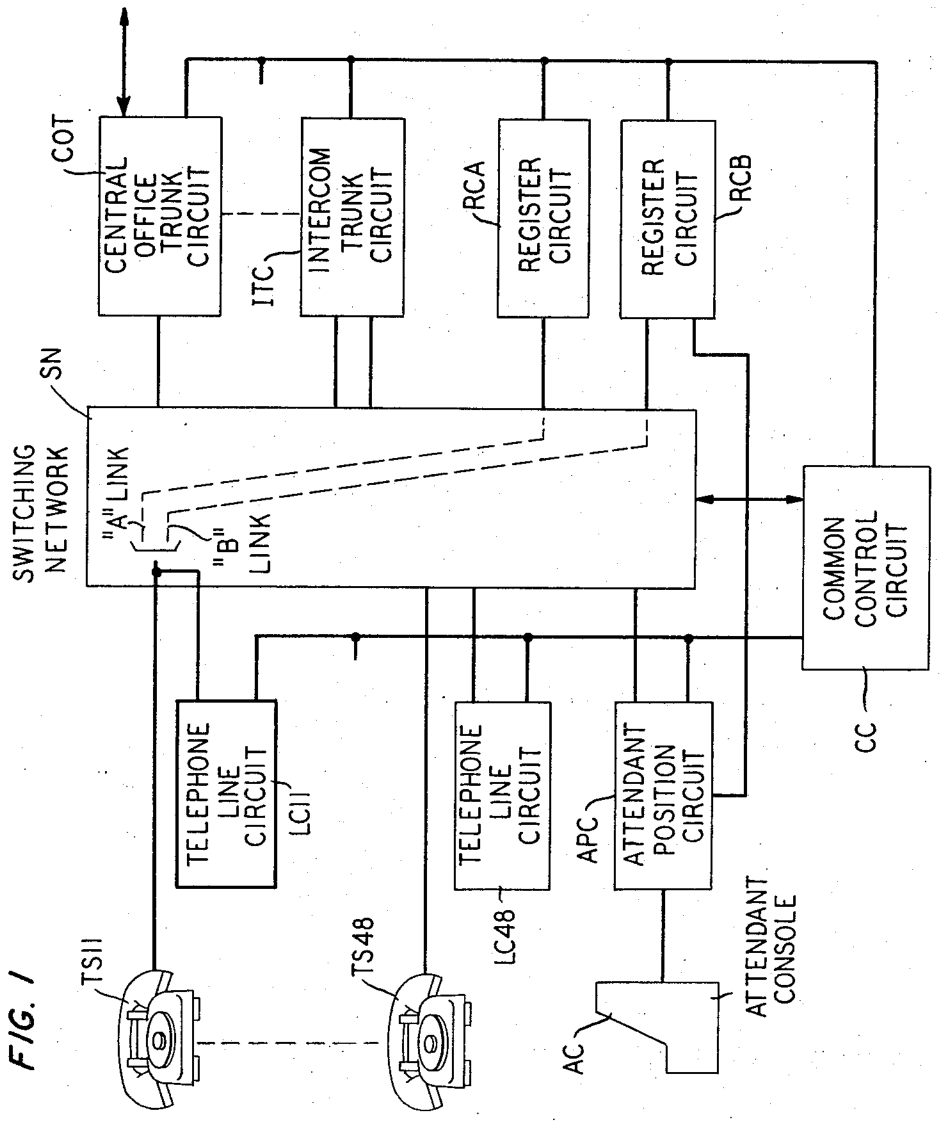
FIG. 1 comprises a block diagram of a telephone system comprising the present invention.

It is noted that the invention is particularly concerned with structural details on the line circuit shown in the heavy line block of FIG. 1 and with parts of the switching network and register circuit. The detailed design of the other circuit units form no part of the present invention and are therefore neither shown nor described in detail herein except where necessary for a complete understanding of the present invention. For example, the switching network is illustratively a conventional 6-wire crossbar switch network with known "A" and "B" link arrangements.

GENERAL DESCRIPTION

The telephone system as disclosed in FIG. 1 is particularly suitable for use as a small private branch exchange which includes a plurality of telephone stations TS11–TS48, each of which is connected to a correspondingly numbered one of the line circuits LC11–LC48 via a switching network SN. Each of the line circuits is additionally connected to a common control circuit CC. Network SN provides "A" and "B" links for call connections and also terminates a number of trunk circuits such as central office trunk circuit COT, intercom trunk circuit ITC, registers RCA and RCB, and an attendant position circuit APC to an attendant console AC. The common control circuit CC regulates and coordinates the operation of every circuit in the system during the serving of calls and accordingly it is connected to the line circuits, switching network, register and the various trunk circuits.

A call is initiated in a conventional manner when a calling party lifts the handset of his station preparatory to dialing the digits of the called number. The off-hook condition is detected by the common control CC during a scanning action. The common control as a result of the scanning identifies the calling line and selects an idle one of the two registers RCA and RCB. Next, the control circuit CC marks both ends of the switching network SN so that it completes a path between the calling line circuit and the selected register and then becomes idle.

Once this connection is established the customer returns dial tone to the calling line and the cutomer proceeds to dial the digits of the called station into the selected register in a conventional manner. The register signals the common control upon the completion of the dialing operation and then transmits the dialed number thereto. The common control CC next selects an idle trunk circuit either intercom or central office trunk ITC or COT, and marks the SN network termination of that selected truck.

At this stage of the call, the calling line circuit is yet connected to the register and the common control circuit has no information as to the identity of the calling line. To identify the line circuit, the common control circuit commands the register to initiate a callback operation by sending a callback potential back to the calling line circuit through the network SN and then initiating a scanning operation which identifies the calling line circuit. The register is thereafter released from the call connection. After the calling line circuit is identified, the common control marks the network termination of the calling line circuit and a network termination of the selected trunk circuit for establishing a call connection between the calling line circuit and the selected trunk for further call processing in a conventional manner.

DETAILED DESCRIPTION

Figure 2:
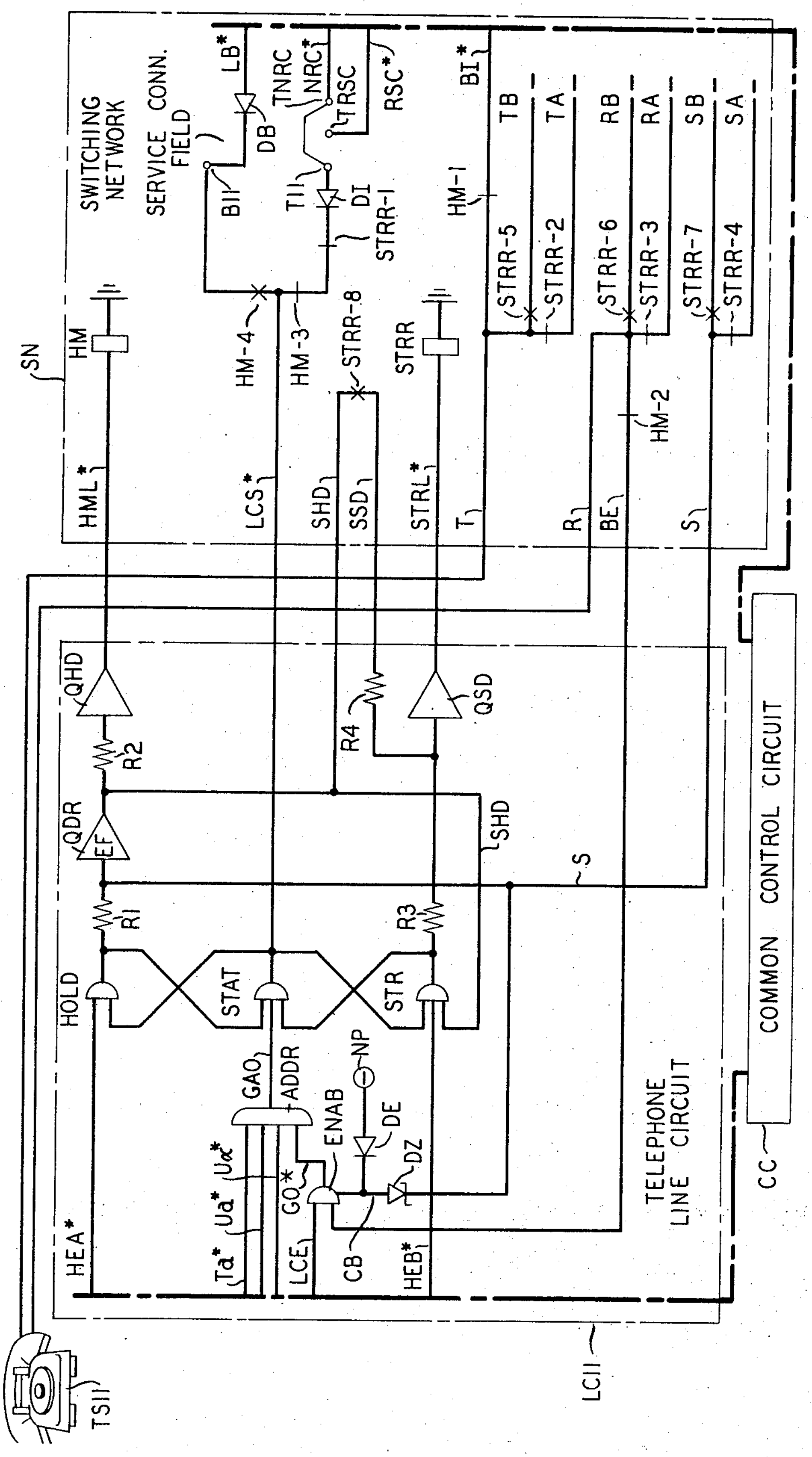
FIG. 2 is a schematic diagram of the basic line circuit including the line address gate and zener diode controlled gate circuitry.

Turning now to FIG. 2, the specific illustrative structure and operation of our callback circuitry is described with reference to line circuit LC11. Telephone station TS11 is connected over tip and ring leads T and R to switching network, SN. Tip lead T is extended through network SN to common control circuit CC for service request monitoring via an off-normal contact HM-1 of a conventional crossbar switch hold magnet and lead BI. Ring lead R is connected through network SN to line circuit LC11 via lead BE and another off-normal contact HM-2. When station TS11 is on-hook, tip and ring leads T and R are opened and no call connections exist through network SN to the tip, ring and sleeve leads T, R and S for station TS11.

In accordance with an aspect of our invention, an enable gate ENAB of circuit LC11 is connected to lead BE for detecting service requests from station TS11. Gate ENAB is also advantageously connected to sleeve lead S and a zener diode arrangement for callback operations. For service request and callback scanning operations, gate ENAB is connected to common control circuit CC via a line circuit enable lead LCE which is multipled to all other line circuits LC12–LC48. An output lead GO* of gate ENAB is connected as an input to an address gate ADDR of line circuit LC11.

Gate ADDR cooperates with the common control CC and other circuits of the system to perform service request and callback scanning. It receives individual station line address scan signals from circuit CC via conductors $Ta$*, $Ua$* and $Ux$*. Conductor $Ta$* is multiplied to all line circuits in the same "tens" group which for line circuit LC11 is the line circuits LC11–LC19. Conductors $Ua$* and $Ux$* are multipled to all other line circuits sharing the same units digit. Thus, for line circuit LC11, all line circuits having the same "1" units digit are multiple connected to the conductors $Ua$* and $Ux$*. An output lead GAO is connected to an input of a status gate STAT and generates a control signal indicating the identity of the line circuit when the gate ADDR is fully enabled.

The latter gate is utilized to supply the common control CC with information as to the bush-idle and callback status of a scanned line during scanning operations. Specifically, during service request scanning, gate STAT receives a single input signal from gate ADDR for supplying an output service request signal to lead LCS* which is passed to control circuit CC via network SN. The output signals pass through network SN via a hold magnet off-normal contact HM-3 and a steering relay contact STRR-1 and diode DI to terminal T11 of a service connection field. The latter comprises terminals for appropriate crossconnections illustratively for class-of-service. By way of example, class-of-service crossconnections are made for line circuit LC11 between terminal T11 and a nonrestricted class-of-service terminal TNRC associated with conductor NRC* to the common control CC. Terminal TRSC in the crossconnection field is used for restricted class-of-service which illustratively limits a station to intercom and attendant calls.

Another gate HOLD is functionally interrelated with the common control circuit operations for controlling the actuation of a crossbar switch hold magnet HM in network SN to establish call connections. Typically, the common control first determines the busy-idle status of a line circuit in call processing by scan monitoring of gate STAT. Thereafter, the common control applies a control signal to lead HEA* which cooperates with a signal from gate STAT to enable gate HOLD. The latter gate, when enabled, drives amplifiers QDR and QHD to operate hold magnet HM and also locks the state of gate STAT.

A further gate STR is used illustratively in combination with a steering relay STRR and amplifier QSD to steer the tip, ring and sleeve leads to "A" and "B" three-wire links through network SN.

IDLE CONDITION

During the idle condition of circuit LC11, station TS11 is on-hook and the common control circuit CC processes calls through other of the line and attendant circuits of the system. In doing so, it applies line scanning and other call processing signals to leads which are multiple in common to a plurality of the line circuits LC11–LC48. These leads includes, for example, the common tens and units address leads T*a**, U*a** and U*x** and the common line circuit enable lead LCE, as well as the hold enable lead and HEA*, leads BI* and HEB*.

Before describing the switching state of various gates in circuit LC11 as controlled by circuit CC, it is beneficial to review that the output of an OFF gate is referred to as a "HIGH" and illustratively is several volts above −24 volts. In a similar fashion, the output of an ON gate is referred to as "LOW" and is illustratively −24 volts.

When the control circuit CC is also idle, it applies a LOW to the line circuit enable lead LCE for switching gate ENAB OFF and in turn holding gate ADDR ON. At the same time, the address leads T*a**, U*a** and U*x** are held HIGH in the absence of call process scanning operations. The idle control circuit CC also leads leads HEB*, BI* and HEA* HIGH. All inputs to gate STAT are therefore LOW for indicating the idle condition of station TS11 and control circuit CC. Thus, gate STAT is OFF and it holds a HIGH on lead LCS*. In summary, during the idle condition of circuit LC11, the leads having a * symbol following the lead designation have a HIGH thereon and all other leads of circuit LC11 have a LOW thereon.

Originating Call

A. Dial Tone Service Request

When station TS11 goes off-hook, it initiates a service request by completing a d.c. path from lead BI* through a hold magnet off-normal contact HM-1, lead T, station TS11, lead R, and contact HM-2 to lead BE of circuit LC11. As a result, the HIGH on lead BI* is connected to lead BE for switching gate ENAB to its ON state and thereby partially enabling gate ADDR.

In the illustrative system, the common control CC supplies scanning address signals sequentially to address leads including leads T*a**, U*a** and U*x** for service request detections. When circuit CC scan addresses line circuit LC11, it switches all of the conductors T*a**, U*a** and U*x** LOW for turning gate ADDR OFF. The output HIGH of gate ADDR switches ON the gate STAT for placing a LOW on line circuit status lead LCS* to network SN. With both the hold magnet HM and steering relay STRR released, the LOW on lead LCS* propagates a dial tone service request signal for circuit LC11 to circuit CC via contacts HM-3 and STRR-1, diode DI, the service connection field and lead NRC*.

B. Station to Register Connection

In response to a dial tone service request, control circuit CC stops scanning and hold the address leads of line circuit LC11 LOW. The common control next selects an idle register RCA or RCB for signaling it to send information as to wether it is a steered or nonsteered register circuit. A steered circuit illustratively uses a three-wire level "B" link of a six-wire crossbar switch network SN while a nonsteered circuit uses the other three-wire level "A" link of the six-wire switch network. Information on the steered or nonsteered status of a register is needed so that the line circuit can control the operation of relay STRR for switching the tip and ring leads T and R of station TS11 and the sleeve lead S to the "A" or "B" level links.

If the selected register is a nonsteered circuit, the common control causes a sequence of operations which results in the operation of network SN to interconnect line circuit LC11 with the selected register. The operations are initiated when circuit CC makes lead LCE HIGH to hold gate ENAB ON. Control circuit CC concurrently makes lead HEA* LOW to switch gate HOLD OFF for driving amplifiers QDR and QHD via resistors R1 and R2 to operate hold magnet HM.

In operating, magnet HM activate network SN in a known manner to establish tip, ring and sleeve lead connections from the selected nonsteered register to station TS11 and circuit LC11. Station TS11 is connected over leads T and R and contacts STRR-2 and STRR-3 to the SN network tip and ring leads TA and RA of the "A" link. Circuit LC11 is connected via sleeve lead S and contact STRR-4 to the SN network sleeve SA. The nonsteered register than transmits in a known manner a HIGH through network SN to lead S for holding amplifiers QDR and QHD on and thereby maintaining magnet HM operated.

On the other hand, if the selected register is a steered circuit, the common control CC, after being informed of the steered status, proceeds to control the operation of relay STRR before the operation of magnet HM. To do so, the common control CC switches lead LCE HIGH and leads HEB* LOW. The latter signal in coincidence with the emitter follower amplifier QDR ON and gate STAT ON causes gate STR to turn OFF for driving amplifier QSD via resistor R3 to operate relay STRR. In operating, relay STRR switches the tip and ring leads T and R of station TS11 from leads TA and RA to TB and RB via contacts STRR-5 and STRR-6. Lead S to circuit LC11 is also switched from lead SA to SB via contact STRR-7. Operated relay STRR also informs the common control CC of its operation by opening contact STRR-1 to remove the dial tone service request from lead NRC*. Next, the common control CC switches lead HEA* LOW to turn OFF gate HOLD and in turn activate amplifier QDR to hold amplifier QSD ON via lead SHD, contact STRR-8, lead SSD and resistor R4. The activated amplifier QDR output HIGH also turns ON gate STR via lead SHD and drives amplifier QHD for operating hold magnet HM.

The operation of magnet HM opens contact HM-2 to disconnect line circuit LC11 from the tip and ring leads T and R. Activated contact HM-1 also disconnects lead BI from tip lead T. The operation of contact HM-4 informs the common control that the connection between station TS11 and the selected register has been established. Specifically, contact HM-4 does so by switching the LOW on lead LCS* to lead LB via terminal B11 and diode DB. Common control circuit CC thereafter switches lead LCE LOW to turn OFF gate ENAB which then switches gate ADDR ON. Circuit CC also switches lead HEA* HIGH to turn ON gate HOLD for switching OFF the gate STAT and thereby returning leads LCS* and LB* to their idle (HIGH) state.

Station TS11 is now connected through the network SN to the selected register which maintains the network connections by holding the hold magnet HM operated as well as relay STRR for a steered register by the HIGH on sleeve lead S as priorly explained. The register next returns dial tone to the caller as a signal to commerce dialing. The called number is then transmitted from station TS11 over the established network connections for storage in the register.

After storing the called number, the register passes it to the common control CC. The latter circuit then decodes the received number and in response thereto determined and selects an appropriate one of the central office or intercom trunk circuits needed to complete the call.

Callback of Station TS11

Before the common control CC is able to effect a connection between line circuit LC11 and the selected trunk circuit, it is necessary to determine the address of circuit LC11 and to disconnect it from the register. At this stage of the call, the address of the line circuit connected to the register is not stored in the system. As a result, the exemplary system obtains it by a callback process which includes first marking the calling line circuit and the scanning the line circuits to identify the address of the marked circuit. The address is required at this juncture of the call so that the calling station can be released from network connections to the register and thereafter be connected to the selected trunk circuit.

After the trunk circuit selection has been completed as already explained, the common control CC instructs the register to initiate a callback of station TS11. This results in the marking of the sleeve lead S of circuit LC11 for address identification during callback line scanning. The register causes the callback sleeve marking by switching the potential on sleeve lead S from a HIGH (for example −18 volts) to a more positive potential (for example −10 volts) in a known manner and via the network SN sleeve lead path including lead SA or SB and contacts STRR-4 or STRR-7. In accordance with the illustrative embodiment of our invention, the callback voltage on lead S advantageously switches zener diode DZ into its zener operating region for applying a HIGH to lead CB which turns ON gate ENAB and thereby marks line circuit LC11 as the called back circuit. In addition, the callback voltage on lead S maintains the amplifiers QDR and QHD ON for holding the register to line circuit LC11 connections through network diode DE protects gate ENAB from voltage surges caused by lightning hits on the ring lead R.

It is an advantage of our invention that the zener diode arrangement provides for positive recognition of a callback voltage on lead S as distinguished from a supervisory HIGH signal which is used as priorly described for maintaining call connections by the holding operated of magnet HM and relay STRR. Another advantageous feature is that the zener diode arrangement for controlling gate ENAB provides electrical isolation between the service request circuitry associated with lead BE and the callback signaling and call connection holding path over the sleeve lead S.

During the callback sequence for circuit LC11, the common control CC makes both leads LCE and BI* LOW. The LOW on the latter lead precludes service requesting line circuits from being recognized during the callback scanning. As a result, only the ENAB gate in line circuit LC11 is ON at this time. The resultant LOW output of gate ENAB in turn enables its address gate ADDR. Next, the common control initiates a callback scanning operation which results in LOW signals being applied to all three of the address leads $Ta^*$, $Ua^*$, $Ux^*$ for circuit LC11. The latter signals in coincidence with the LOW from gate ENAB on lead GO* turns off gate ADDR which in turn switches gate STAT ON and applies a callback status signal to lead LCS*.

The LOW on lead LCS* is extended through the make contact HM-4, terminal B11, and diode DB to lead LB* for informing the common control CC of the identity of the called back line circuit. Control circuit CC thereupon stops scanning and instructs the register to release its connections through network SN to circuit LC11 by removing the callback voltage from sleeve lead S and substituting a LOW thereon. In response to the latter signal, amplifier QDR is effective to release hold magnet HM and relay STRR is operated.

Prior to the release of the network connections between circuit LC11 and the register, the common control CC makes lead LCE HIGH for holding gate ENAB ON after the sleeve lead S is switched LOW. Upon the release of the network connections, the LOW on lead LCS* propagates through to the common control CC as a check signal indicating the release of the connections. The LOW is propagated from lead LCS* through contact HM-3, contact STRR-1, diode DI, terminals T11 and TNRC to lead NRC.

Station to Trunk Connection

Following the receipt of the aforementioned check signal, the common control commands the selected trunk circuit to identify whether it is a steered or non-steered circuit. The common control then proceeds to establish connections through network SN between the line circuit LC11 and the selected trunk circuit in essentially the same manner as hereinbefore explained with regard to the line circuit to register connections.

Upon the completion of the trunk to line circuit connections, the trunk circuit places a HIGH on the sleeve lead path through network SN which propagates to lead S for holding amplifiers QDR and QHD ON to maintain the hold magnet HM operated. The completion of the connections is indicated to the common control when magnet HM operates and thereby extends the LOW on lead LCS* to lead LB* via contact HM-4, terminal B11 and diode DB. The common control CC next returns leads BI*, LCE, HEA*, Ua*, Ux* and Ta* to their idle HIGH state for switching gate STAT OFF and thereby making LCS* HIGH. Line circuit LC11 thereafter is held busy by a HIGH on the sleeve lead S from the trunk circuit for the duration of the call.

It is understood that the above-described arrangements are illustrative of the application for the principles of this invention. In light of this teaching, it is apparent that numerous other arrangements may be devised by those skilled in the art without departing from the spirit and scope of the invention. Illustratively, our invention is disclosed with respect to callback sequences involving an originating call. The callback facilities are equally applicable to other call processing sequences used in completing operator and terminating call sequences.

Reference is made to the patent application, Ser. No. 100,315 of W. W. Greason III and D. W. Weiner entitled Line Hunting Circuitry, filed concurrently with this application and wherein a related invention is described.

What is claimed is:

1. A communications switching system comprising:

a plurality of line circuits, each of said line circuits capable of exhibiting a plurality of service states;

a register connectable with said line circuits;

common control means for selectively establishing connections to said line circuits and to said register;

scanning means for routinely scanning said line circuits;

means associated with said line circuits for stopping said routine scanning pursuant to the initiation of a service requesting state at one of said line circuits; said common control means thereupon establishing a dialing connection from said one of said line circuits to said register, said register thereupon applying a first magnitude potential to said one of said line circuits to maintain said dialing connection from said one of said line circuits to said register, said register replacing said first magnitude potential with a second magnitude potential of the same polarity after the completion of dialing, whereupon said common control means controls said scanning means to resume the scanning of said line circuits; and zener diode means connected to said associated means at said one of said line circuits responsive to the appearance of said second magnitude potential for again stopping said scanning means, said common control means thereupon completing a communications connection to said one of said line circuits.

2. A communications switching system according to claim 1 wherein said zener diode means is poled to remain in a nonconducting state when said first magnitude potential is applied by said register and is placed in a conducting state only when said second magnitude potential is applied by said register.

3. A communications switching system according to claim 2 wherein said means associated with said line circuits for stopping said routine scanning comprises a gate for generating a scanning stopping signal, said gate being energizable in response to either a service request signal or a signal generated by said zener diode means when placed in said conducting state.

4. A line circuit for a common control switching system employing a scanner, said line circuit including a sleeve conductor for receiving a holding potential to maintain switching connections extended to said circuit, comprising:

gate means having an output and a plurality of inputs, a first of said inputs being energized when said circuit is in a service requesting state to produce a predetermined scannable signal at said output; and means connecting a second of said plurality of inputs to said sleeve conductor, said connecting means being selectively energizable to produce said predetermined signal at said output, said connecting means including zener diode means for blocking said holding potential from said second of said plurality of inputs.

5. A line circuit according to claim 4 wherein said gate means includes an enabling gate and an addressable gate, said enabling gate being energizable to enable said addressable gate in response to either said line circuit being in a service requesting state or said connecting means being energized, said addressable gate, when enabled, being energizable by the receipt of signals from said scanner to produce said predetermined signal.

6. A line circuit for a communication line in a communication system comprising:

an address gate for generating an address control signal indicating the identity of the circuit, means for enabling said address gate, said means including means for applying scanning signals to said address gate and an enable gate, first means for enabling said enable gate upon a service request from the communication line, second means independent of said first means for enabling said enable gate upon a callback to the communication line, said second means including a supervisory conductor, and means for preventing other signals on said supervisory conductor not indicating a callback from enabling said enable gate.

7. A line circuit in accordance with claim 6 wherein said preventing means includes a Zener diode connecting said supervisory conductor to said enable gate.

* * * * *